United States Patent
Strack

(10) Patent No.: US 9,463,592 B2
(45) Date of Patent: Oct. 11, 2016

(54) APPARATUS FOR PRODUCING A LINER OF A CONTAINER

(71) Applicant: GM Global Technology Operations LLC, Detroit, MI (US)

(72) Inventor: Ludger Strack, Heidenrod (DE)

(73) Assignee: GM Global Technology Operations LLC, Detroit, MI (US)

( * ) Notice: Subject to any disclaimer, the term of this patent is extended or adjusted under 35 U.S.C. 154(b) by 364 days.

(21) Appl. No.: 14/146,809

(22) Filed: Jan. 3, 2014

(65) Prior Publication Data

US 2014/0120204 A1 May 1, 2014

Related U.S. Application Data

(62) Division of application No. 12/720,951, filed on Mar. 10, 2010, now Pat. No. 8,647,559.

(51) Int. Cl.
| | |
|---|---|
| *B29C 49/20* | (2006.01) |
| *B29C 49/24* | (2006.01) |
| *B29C 49/48* | (2006.01) |
| *B29C 49/42* | (2006.01) |
| *F17C 1/16* | (2006.01) |

(52) U.S. Cl.
CPC .............. *B29C 49/48* (2013.01); *B29C 49/20* (2013.01); *B29C 49/24* (2013.01); *B29C 49/4205* (2013.01); *F17C 1/16* (2013.01); *B29C 2049/2008* (2013.01); *B29C 2049/2026* (2013.01); *B29C 2049/2043* (2013.01); *F17C 2201/0109* (2013.01); *F17C 2201/056* (2013.01); *F17C 2201/058* (2013.01); *F17C 2203/0604* (2013.01); *F17C 2209/2127* (2013.01); *F17C 2221/012* (2013.01); *F17C 2221/033* (2013.01); *F17C 2223/0123* (2013.01); *F17C 2223/036* (2013.01); *Y02E 60/321* (2013.01)

(58) Field of Classification Search
CPC .......... B29C 49/20; B29C 2049/2008; B29C 2049/2026; B29C 2049/2043; B29C 49/24; B29C 2049/2402; B29C 2049/2443
See application file for complete search history.

(56) References Cited

U.S. PATENT DOCUMENTS

| | | | | |
|---|---|---|---|---|
| 2,848,133 | A | * 8/1958 | Ramberg | B29C 53/602 138/DIG. 2 |
| 3,919,373 | A | * 11/1975 | Kormendi | B29C 49/20 264/248 |
| RE28,750 | E | * 3/1976 | Le Troadec | B29C 49/20 264/516 |

(Continued)

FOREIGN PATENT DOCUMENTS

| | | | | |
|---|---|---|---|---|
| DE | | 2825097 A1 * | 3/1980 | B29C 49/20 |
| DE | EP 0300129 A2 * | | 1/1989 | B29C 49/20 |

(Continued)

OTHER PUBLICATIONS

Partial machine translation of JP2006161978A dated Jun. 22, 2006 obtained from the espace website.*

*Primary Examiner* — Robert B Davis
(74) *Attorney, Agent, or Firm* — Fraser Clemens Martin & Miller LLC; James D. Miller

(57) ABSTRACT

Apparatus for manufacture of a liner of a container is disclosed. The apparatus includes an elongate shaft having a first end and a second end, wherein at least one of the first end and the second end receives a container penetration element thereon.

17 Claims, 2 Drawing Sheets

(56) References Cited

U.S. PATENT DOCUMENTS

| | | | |
|---|---|---|---|
| 6,227,402 B1 | 5/2001 | Shimojima et al. | |
| 8,052,915 B2 * | 11/2011 | Lungershausen | B29C 49/20 264/259 |
| 9,227,356 B2 * | 1/2016 | Tani | B29C 49/20 |
| 2010/0255234 A1 * | 10/2010 | Koetke | B29C 49/20 428/35.8 |

FOREIGN PATENT DOCUMENTS

| | | | |
|---|---|---|---|
| DE | 19526154 A1 | | 1/1997 |
| JP | 2006161978 A | * | 6/2006 |
| JP | 2008164112 A | * | 7/2008 |
| JP | 2008164113 A | * | 7/2008 |
| WO | 9939896 A1 | | 8/1999 |
| WO | 2007079971 A1 | | 7/2007 |

* cited by examiner

US 9,463,592 B2

APPARATUS FOR PRODUCING A LINER OF A CONTAINER

CROSS-REFERENCE TO RELATED APPLICATIONS

This application is a divisional application of U.S. patent application Ser. No. 12/720,951 filed on Mar. 10, 2010.

FIELD OF THE INVENTION

The invention relates to containers. More particularly, the invention is directed to a method and apparatus for producing a liner of a container including at least one container penetration element.

BACKGROUND OF THE INVENTION

Presently, there is a variety of containers designed to contain various fluids such as compressed natural gas (CNG), hydrogen gas for use in a fuel cell, and the like, for example. A common technique for storing the fluid is in a lightweight, high pressure container resistant to punctures. Traditionally, such containers are divided into four types. A Type I container is a metal container. A Type II container is also a metal container, the container having an outer composite shell disposed on a cylindrical section thereof. A Type III container consists of a liner produced from a metal such as steel and aluminum, for example, and an outer composite shell that encompasses the liner and militates against damage thereto. A Type IV container is substantially similar to the Type III container, wherein the liner is produced from a plastic. Typically, the plastic container liner is manufactured using a conventional injection molding, blow molding, or rotational molding process. For example, the following patent documents describe a blow molded liner (WO 99/39896 Dulisse, JMK; WO 2007/079971 Müller, Xperion; DE 19526154 Lange, Mannesmann etc.), each of which is incorporated herein by reference in its entirety.

Typically, each type of container is configured with an orifice to permit a controlled flow of the fluid in and out of a chamber of the container. The orifice receives a container penetration element therein. The container penetration element typically is a threaded or otherwise shaped adapter for connection to nozzles, valves, gauges, tubes, and similar fixtures which direct and control the fluid flow. Accordingly, the container penetration element is formed of a metal or another conventional material having desired properties. The container penetration element typically includes a cylindrical neck with a longitudinal passage that provides fluid communication between the chamber and the environment outside the container. In certain designs, a flange is secured to one end of the neck. The flange, which is larger than the chamber orifice, is secured to the liner of the container to militate against relative movement between the container penetration element and the liner.

It would be desirable to develop an apparatus and a method of use thereof for forming a liner of a container including at least one container penetration element.

SUMMARY OF THE INVENTION

In concordance and agreement with the present invention, an apparatus and a method of use thereof for forming a liner of a container including at least one container penetration element, has surprisingly been discovered.

In one embodiment, a positioning apparatus comprises: an elongate shaft having a first end and a second end, wherein at least one of the first end and the second end receives a container penetration element thereon.

In another embodiment, a positioning apparatus comprises: an elongate shaft having a first end and a second end, the shaft having a passageway and a plurality of apertures formed therein, and at least one of the first end and the second end having threads formed thereon, wherein at least one of the first end and the second end receives a container penetration element thereon; and a fluid source in fluid communication with the second end, the passageway, and the plurality of apertures.

The invention also provides methods for manufacturing a liner of a container having at least one container penetration element disposed therein.

One method comprises the steps of: providing a positioning apparatus including an elongate shaft having a first end and a second end; providing a first container penetration element; providing a parison; disposing the first container penetration element onto one of the first end and the second end of the positioning apparatus to form a substantially fluid-tight connection; guiding the parison around the positioning apparatus having the first container penetration element disposed thereon; forming the parison into a hollow liner; and removing the positioning apparatus from the first container penetration element.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
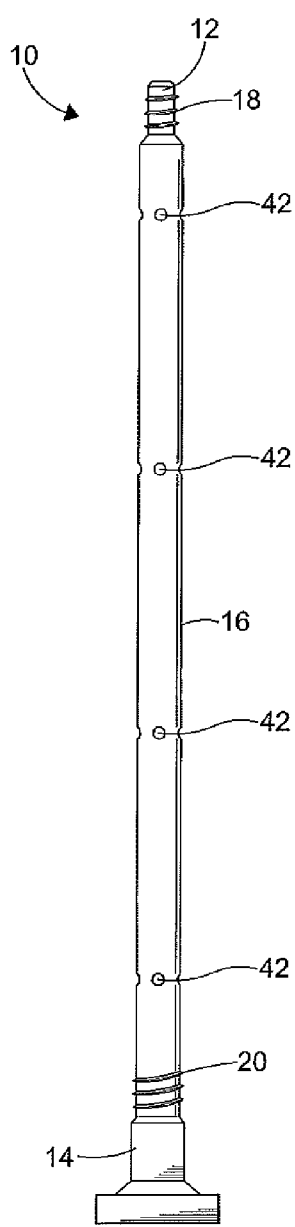
FIG. 1 is a side elevational view of an apparatus for positioning at least one container penetration element during manufacturing of a container according to an embodiment of the present invention.
Figure 2:
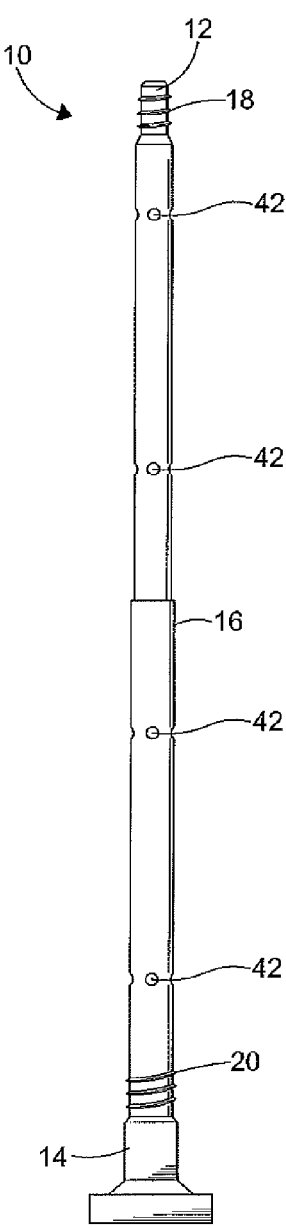
FIG. 2 is a side elevational view of an apparatus for positioning at least one container penetration element, wherein the apparatus includes a telescoping shaft portion.

FIG. 1 illustrates a positioning apparatus 10 for use in the manufacture of a container (not shown) according to an embodiment of the present invention. It is understood that the container can be any container type such as those designed to contain various compressed and pressurized gases (e.g. compressed natural gas and hydrogen gas for use in a fuel cell), for example. The positioning apparatus 10 is an elongated shaft 16 having a first end 12 and a second end 14. A diameter of the first end 12 is less than a diameter of the second end 14. Each of the first end 12 and the second end 14 includes threads 18, 20, respectively, formed thereon. It is understood that the positioning apparatus 10 can have any length and diameter as desired suitable for any type of container. It is further understood that the positioning apparatus 10 can have an adjustable length and an adjustable diameter if desired. Although the positioning apparatus 10 shown is a unitary structure, it is understood that the positioning apparatus 10 can be an integration of multiple structures if desired. It is further understood that the positioning apparatus 10 can be a telescoping apparatus as shown in FIG. 2, thereby minimizing a time and a space required for use of the positioning apparatus 10 and the manufacture of a hollow liner 44 shown in FIG. 4 of the container. The positioning apparatus 10 can be produced from any material as desired such as a metal material, for example. The positioning apparatus 10 receives at least one container penetration element 24, 28, 34, 38 thereon as shown in FIGS. 3 and 4, and described hereinafter.

Figure 3:
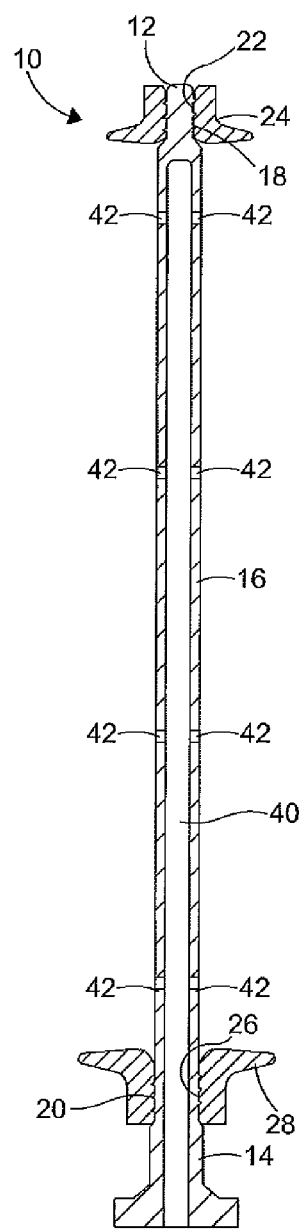
FIG. 3 is a side cross-sectional elevational view of the apparatus illustrated in FIG. 1, showing two container penetration elements disposed thereon.

Referring now to FIG. 3, the threads 18 of the first end 12 cooperate with threads 22 formed on an inner surface of the container penetration element 24 to form a substantially fluid-tight threaded connection. It is understood, however, that the substantially fluid-tight connection can be formed elsewhere between various mating surfaces of the first end 12 and the container penetration element 24 as desired. Although the container penetration element 24 shown is an adapter for receiving various fixtures and utility devices such as pressure regulators (e.g. a thermal pressure relief device), nozzles, valves, gauges, tubes, and similar fixtures which direct and control fluid flow in and out of the container (e.g. an "on-the-tank" valve), it is understood that the container penetration element 24 can be any type of container penetration element as desired such as an insert, a fitting, a seal, a sensor, and the like, for example. In a non-limiting example, a major diameter of the threads 18 of the first end 12 is 0.75 inches. It is understood that the threads 18, 22 can have any major diameter and minor diameter as desired.

Threads 26 formed on an inner surface of the container penetration element 28 cooperate with the threads 20 formed on the second end 14 of the positioning apparatus 10 to form a substantially fluid-tight threaded connection. It is understood, however, that the substantially fluid-tight connection can be formed elsewhere between various mating surfaces of the second end 14 and the container penetration element 28 as desired. Although the container penetration element 28 shown is an adapter for receiving various fixtures and utility devices such as pressure regulators (e.g. a thermal pressure relief device), nozzles, valves, gauges, tubes, and similar fixtures which direct and control fluid flow in and out of the container (e.g. an "on-the-tank" valve), it is understood that the container penetration element 28 can be any type of container penetration element as desired such as an insert, a fitting, a seal, a sensor, and the like, for example. In a non-limiting example, a major diameter of the threads 20 is 1.0 inch. It is understood that the threads 20, 26 can have any major diameter and minor diameter as desired. As illustrated, the threads 18, 20, 22, 26 are coarse threads to facilitate a high turn rate. Accordingly, time expended to secure the container penetration elements 24, 28 to the positioning apparatus 10 and remove the container penetration elements 24, 28 therefrom is minimized. It is understood, however, that the threads 18, 20, 22, 26 can be any thread type as desired. It is further understood that the container penetration elements 24, 28 can be removably secured to the positioning apparatus 10 by other methods of connection such as a dovetail interlock connection, a ball and detent connection, a lock bar connection, and the like, for example.

Figure 4:
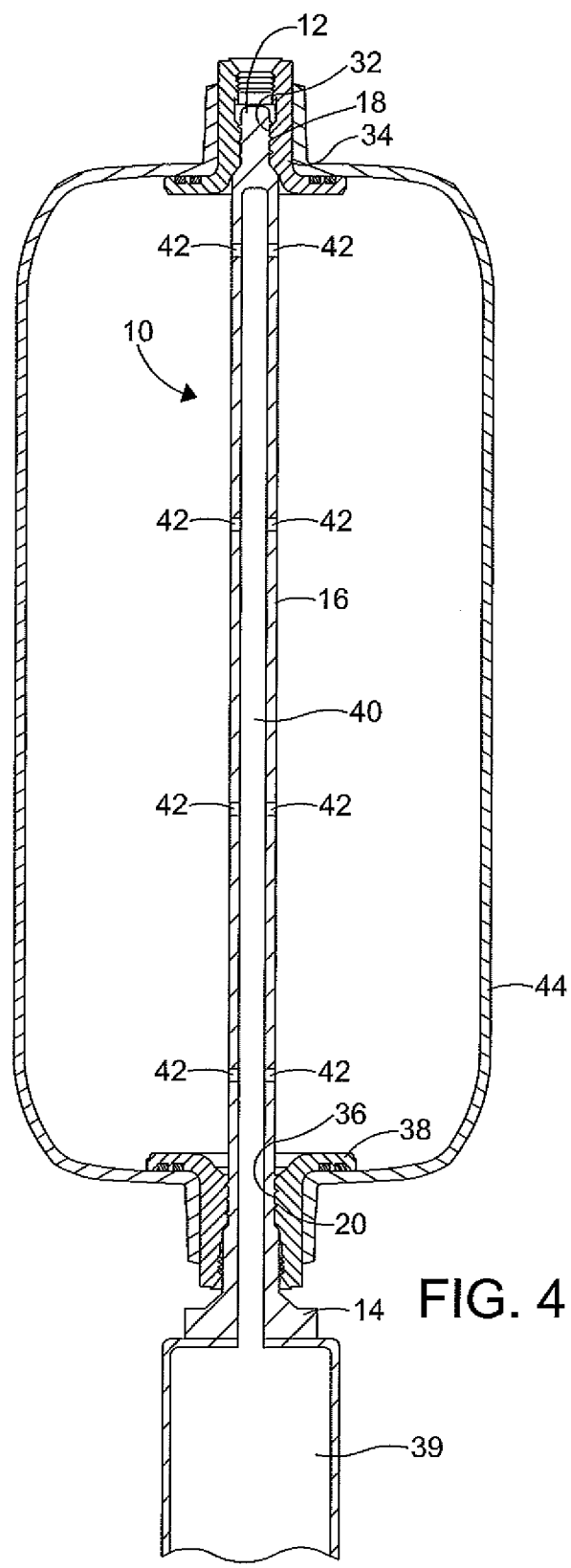
FIG. 4 is a schematic cross-sectional view of the apparatus illustrated in FIG. 1 having two container penetration elements disposed thereon, wherein the apparatus is disposed in a liner of a container.

In another embodiment shown in FIG. 4, the threads 18 of the first end 12 cooperate with threads 32 formed on an inner surface of the container penetration element 34 to form a substantially fluid-tight threaded connection. It is understood, however, that the substantially fluid-tight connection can be formed elsewhere between various mating surfaces of the first end 12 and the container penetration element 34 as desired. Although the container penetration element 34 shown is a portion of a multi-piece adapter for receiving various fixtures and utility devices such as pressure regulators (e.g. a thermal pressure relief device), nozzles, valves, gauges, tubes, and similar fixtures which direct and control fluid flow in and out of the container (e.g. an "on-the-tank" valve), it is understood that the container penetration element 34 can be any type of container penetration element as desired such as a portion of an insert, a fitting, a seal, a sensor, and the like, for example. It is further understood that the threads 18, 32 can have any major diameter and minor diameter as desired.

Threads 36 formed on an inner surface of the container penetration element 38 cooperate with the threads 20 formed on the second end 14 of the positioning apparatus 10 to form a substantially fluid-tight threaded connection. It is understood, however, that the substantially fluid-tight connection can be formed elsewhere between various mating surfaces of the second end 14 and the container penetration element 38 as desired. Although the container penetration element 38 shown is a portion of a multi-piece adapter for receiving various fixtures and utility devices such as pressure regulators (e.g. a thermal pressure relief device), nozzles, valves, gauges, tubes, and similar fixtures which direct and control fluid flow in and out of the container (e.g. an "on-the-tank" valve), it is understood that the container penetration element 38 can be any type of container penetration element as desired such as a portion of an insert, a fitting, a seal, a sensor, and the like, for example. It is further understood that the threads 20, 36 can have any major diameter and minor diameter as desired. As illustrated, the threads 18, 20, 32, 36 are coarse threads to facilitate a high turn rate. Accordingly, time expended to secure the container penetration elements 34, 38 to the positioning apparatus 10 and remove the container penetration elements 34, 38 therefrom is minimized. It is understood, however, that the threads 18, 20, 32, 36 can be any thread type as desired. It is further understood that the container penetration elements 34, 38 can be removably secured to the positioning apparatus 10 by other methods of connection such as a dovetail interlock connection, a ball and detent connection, a lock bar connection, and the like, for example.

The second end 14 is in fluid communication with a fluid source 39. It is understood that the fluid can be any fluid as desired such as air, for example. The second end 14 may be coupled to the fluid source 39 such as by a quick connection, a threaded connection, and the like, for example. It is understood that the fluid source 39 can be integrally formed with the positioning apparatus 10 if desired. A passageway 40 is formed in the shaft 16. The passageway 40 is in fluid communication with the fluid source 39 through an opening in the second end 14. The shaft 16 includes a plurality of linearly spaced annular arrays of apertures 42 formed therein. The apertures 42 permit a flow of the fluid from the passageway 40 to an environment surrounding the positioning apparatus 10. In the embodiment shown, the apertures 42 have a uniform size and shape and are uniformly spaced apart to facilitate a proper inflation of the hollow liner 44 of the container. It is understood that the apertures 42 can have any size and shape and can be spaced apart as desired.

In use, one of the container penetration elements 28, 38 is disposed on the second end 14 of the positioning apparatus 10. Thereafter, one of the container penetration elements 24, 34 is disposed on the first end 12 of the positioning apparatus 10. The container penetration elements 24, 28, 34, 38 are removably secured to the positioning apparatus 10 such as by a threaded connection, a dovetail interlock connection, a ball and detent connection, a lock bar connection, and the like, for example. In the embodiments shown, the container penetration elements 24, 28, 34, 38 are disposed on the positioning apparatus 10 by rotating the positioning apparatus 10 in a first direction to engage the threads 18, 20, of the positioning apparatus 10 with the threads 22, 26, of the container penetration elements 24, 28 or the threads 32, 36 of the container penetration elements 34, 38. A parison (not shown) is then guided over the positioning apparatus 10. Subsequently, a blow mold tool (not shown) closes around the parison and one of the container penetration elements 24, 34 and one of the container penetration elements 28, 38, securing the parison to the container penetration elements 24, 28, 34, 38 and forming a substantially fluid-tight connection therebetween. The positioning apparatus 10 facilitates a proper position and alignment of the container penetration elements 24, 28, 34, 38 in the parison. The fluid is then caused to flow from the fluid source 39 through the passageway 40 and through the apertures 42 into the environment surrounding the positioning apparatus 10, thereby expanding the parison to conform to the closed blow mold tool and form the hollow liner 44. It is recognized that the hollow liner 44 can be produced from a single layer plastic material, a multi-layer plastic material, and the like, for example. After the hollow liner 44 has a desired form, the blow mold tool releases the formed hollow liner 44. The positioning apparatus 10 is then removed from the container penetration elements 24, 28, 34, 38 such as by a disconnection of the threaded connection, the dovetail interlock connection, the ball and detent connection, the lock bar connection, and the like, for example. In the embodiments shown, the positioning apparatus 10 is removed from the formed hollow liner 44 and the container penetration elements 24, 28, 34, 38 by at least one of a rotational movement and an axial movement thereof. Particularly, the positioning apparatus 10 is removed from the container penetration elements 24, 28, 34, 38 disposed on the positioning apparatus 10 by rotating the positioning apparatus 10 in a second direction to disengage the threads 18, 20, of the positioning apparatus 10 from the threads 22, 26, of the container penetration elements 24, 28 or the threads 32, 36 of the container penetration elements 34, 38.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A positioning apparatus for use in a blow molding process comprising:
    an elongate shaft adapted to be received into a parison, the shaft having a first end and a second end, wherein the shaft is a telescoping cylinder and at least one of the first end and the second end removably receives a container penetration element forming a substantially fluid-tight connection therebetween.

2. The positioning apparatus according to claim 1, wherein a diameter of the first end is smaller than a diameter of the second end.

3. The positioning apparatus according to claim 1, wherein the substantially fluid-tight connection is one of a threaded connection, a dovetail interlock connection, a ball and detent connection, and a lock bar connection.

4. The positioning apparatus according to claim 1, wherein at least one of the first end and the second end includes threads formed thereon.

5. The positioning apparatus according to claim 1, wherein the shaft includes a plurality of apertures formed therein, the apertures in fluid communication with a fluid source for providing a fluid to expand the parison.

6. The positioning apparatus according to claim 1, wherein the shaft includes a passageway formed therein, the passageway in fluid communication with a fluid source for providing a fluid to expand the parison.

7. A positioning apparatus for blow molding a liner of a container comprising:
    an elongate shaft having a first end and a second end adapted to be received into a parison, the shaft including a passageway and a plurality of apertures formed therein, wherein the shaft is a telescoping cylinder and at least one of the first end and the second end removably receives a container penetration element forming a substantially fluid-tight connection therebetween; and
    a fluid source providing a fluid for expanding the parison to form the liner of the container, the fluid source in fluid communication with the second end, the passageway, and the plurality of apertures.

8. The positioning apparatus according to claim 7, wherein the substantially fluid-tight connection is one of a threaded connection, a dovetail interlock connection, a ball and detent connection, and a lock bar connection.

9. The positioning apparatus according to claim 7, wherein at least one of the first end and the second end includes threads formed thereon.

10. A positioning apparatus for use in a blow molding process comprising:
    an elongate shaft adapted to be received into a parison, the shaft having a first end, a second end, and a passageway formed therein;
    a first container penetration element releasably coupled onto the first end of the positioning apparatus to form a first substantially fluid-tight connection; and
    a second container penetration element releasably coupled onto the second end of the positioning apparatus to form a second substantially fluid tight connection wherein the positioning apparatus is configured to have an adjustable length.

11. The positioning apparatus according to claim 10, wherein the elongate shaft includes a plurality of apertures formed therein.

12. The positioning apparatus according to claim 10, wherein the passageway is in fluid communication with a fluid source.

13. The positioning apparatus according to claim 10, wherein the elongate shaft is a telescoping cylinder.

14. The positioning apparatus according to claim 10, wherein one of the first container penetration element and the second container penetration element comprises an adapter for receiving a member selected from the group consisting of a pressure regulator, a thermal pressure relief device, a nozzle, a valve, a gauge, a tube, and combinations thereof.

15. The positioning apparatus according to claim 10, wherein one of the first substantially fluid tight connection and the second substantially fluid-tight connection comprises one of a threaded connection, a dovetail interlock connection, a ball and detent connection, and a lock bar connection.

16. A positioning apparatus for use in a blow molding process comprising:
   an elongate shaft adapted to be received into a parison, the shaft having a first end, a second end. and a passageway formed therein;
   a first container penetration element releasably coupled onto the first end of the positioning apparatus to form a first substantially fluid-tight connection; and
   a second container penetration element releasably coupled onto the second end of the positioning apparatus to form a second substantially fluid tight connection, wherein the positioning apparatus is configured to have an adjustable diameter.

17. An article comprising: a positioning apparatus according to claim 10 for use in a blow molding process; and a parison receiving an elongate shaft of the positioning apparatus.

* * * * *